United States Patent [19]

Setele et al.

[11] 4,017,128
[45] Apr. 12, 1977

[54] BALL BEARING ASSEMBLY

[75] Inventors: William O. Setele, Independence, Ohio; Donald A. Miller, Sterling, Ill.

[73] Assignee: Kendale Industries, Inc., Valley View, Ohio

[22] Filed: Feb. 17, 1976

[21] Appl. No.: 658,520

[52] U.S. Cl. .................... 308/174; 308/184 R; 308/189 R
[51] Int. Cl.[2] .................................. F16C 19/04
[58] Field of Search ............. 308/188, 189 R, 184, 308/200, 174, 176, 189 A, 184 R, 184 A

[56] References Cited
UNITED STATES PATENTS 3,306,679  2/1967  Stokely ..................... 308/184 R
3,415,500  12/1968  Pethis ........................ 308/184 R Primary Examiner—Joseph F. Peters, Jr.
Assistant Examiner—Richard A. Bertsch
Attorney, Agent, or Firm—Woodling, Krost, Granger & Rust

[57] ABSTRACT

A ball bearing assembly incorporating resilient means for cushioning both radial and axial directed thrust, the resilient means being housed in the shell holding the inner and outer race members, and being self contained in the shell ready for mounting to a support. This is an abstract only of the specific illustration of the invention given by way of example, and is not to be used in the interpretation of the claims nor as a limitation on the scope of the invention.

15 Claims, 2 Drawing Figures

U.S. Patent     April 12, 1977     4,017,128

BALL BEARING ASSEMBLY

An object of our invention is the provision for a compact ball bearing assembly constructed to resiliently receive and absorb radial and axial force and to provide a sturdy mount for the bearings.

Another object is the provision for a self contained bearing assembly having resilient shock-absorbing characteristics and which is mountable as a unit in a supporting structure.

Another object is the provision of an economical and yet efficient shock-absorbing type of ball bearing assembly having a structure accommodating for ready and facile fabrication.

Another object is the provision of a self contained bearing unit adaptable for ready mounting to a support such as a tube.

Another object is the provision for the reduction of noise through absorption of noise causing vibration.

Figure 1:
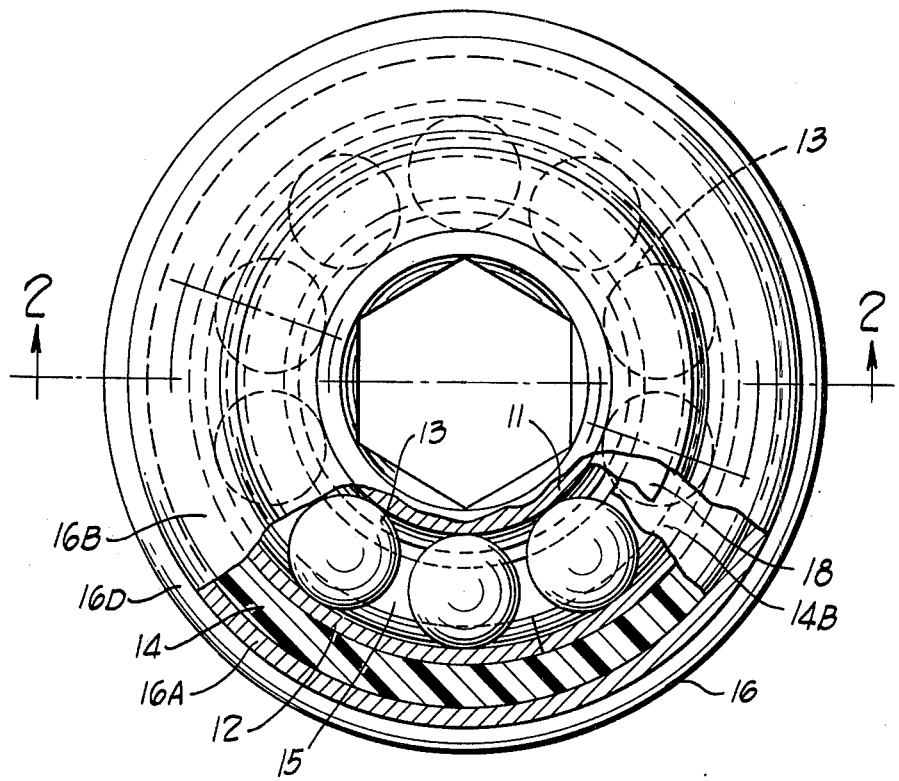
Figure 2:
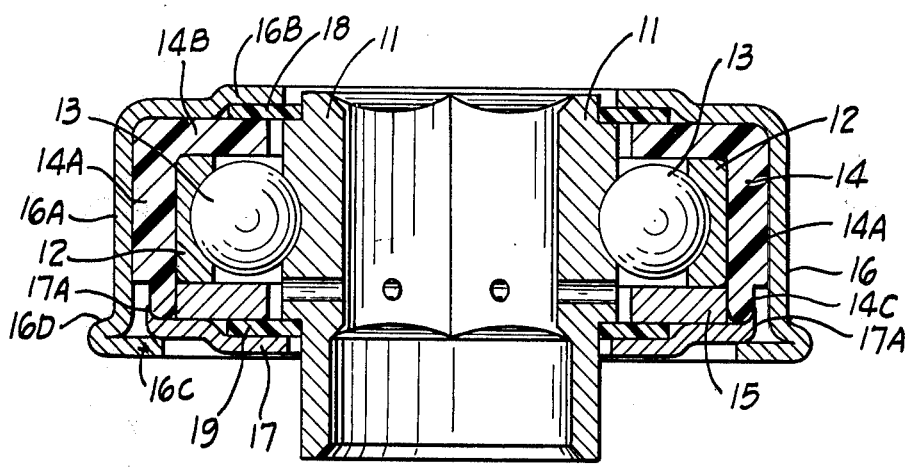

Other objects and a fuller understanding of this invention may be had by referring to the following description and claims, taken in conjunction with the accompanying drawings in which:

FIG. 1 is a plan view looking down on the preferred form of our ball bearing assembly with portions cut away to show the interior of the unit; and FIG. 2 is a longitudinal section view of our ball bearing assembly taken along the line 2—2 of FIG. 1.

Our preferred bearing unit embodies a usual inner race member 11 and outer race member 12, both of steel, having a raceway between them in which a plurality of ball bearings 13 are arranged in the usual circular form. The inner race member 11 is provided with a hexagonal shaped bore adapted to receive a shaft of complementary cross-sectional hexagonal shape.

We include in our unit a resilient member 14 which is made of a suitable elastomeric material having both the resiliency and the degree of hardness or resistance to yielding required for the load to be carried by the bearing unit in use. A suitable elastomeric material is polyethelene, natural or synthetic rubber, and such yieldable materials adapted to receive and absorb shocks without permanent deformation.

The resilient member 14 of generally cup-shape has a rim or outer annular portion 14A which is disposed radially outward of the outer race member 12 as shown. This resiliently absorbs shocks in a radial direction imposed on the unit. The resilient member 14 also has an end wall or web portion 14B extending radially inward from the rim portion 14A to engage and overlap the outer race member 12 at a first end of the assembly, that is the upper end as viewed in FIG. 2. The portion 14B is disposed to resiliently absorb shock or axial force in one axial direction relative to the outer race member 12 as disclosed in the drawings.

At the opposite end of the assembly, that is the lower end as seen in FIG. 2, there is a steel washer 15 having a central opening for accommodating therein the protruding end portion of the inner race member 11. This washer 15 abuts the outer race member 12 at said opposite end of the assembly. The washer 15, resilient member 14, and inner race member 11, except for clearances as shown provided for rotative movement of the ports, generally enclose and guard the ball bearings 13.

We include in our assembly a shell 16 preferably of steel being of a general cup shape. The shell 16 has a rim or outer annular portion 16A and an end wall or web portion 16B extending radially inward from the rim portion 16A toward the inner race member 11.

The rim portion 16A firmly embraces the rim portion 14A of the resilient member to provide firm backing for the said rim portion 14A in receiving radial thrust imparted to the assembly.

The web portion 16B of the shell is adjacent the web portion 14B to closely embrace the same near the rim portion 16A, and is in axial alignment with the outer race member 12 to provide a firm backing to the resilient member in this area. As the web portion 16B extends radially inward, it is somewhat offset as indicated to clear the inner race member 11.

In bearing units in which it is desired to provide seals or shields for protecting the interior of the unit from dust or other foreign material, there are included seals 18 and 19 composed of nylon, teflon, fiber or other suitable material. Seal 18 at one end of the unit (upper end in FIG. 2) is of annular form and is positioned as shown between the offset of portion 16B and the resilient member portion 14B and inner race member. The interfit is such as to prevent dust or foreign material from entering the unit and at the same time to permit ready rotation of the parts relative to each other, such as the inner race member 11 relative to the outer race member 12.

The steel shell 16 is also provided with a shoulder portion 16C at said opposite end of the assembly. A steel retainer member 17, with a central open space for accommodating the protruding end of the inner race member 11, is positioned in the assembly at the said opposite end, that is the lower end as seen in FIG. 2. This retainer member 17 abuts against the washer 15 to hold in position. As the retainer member 17 extends inwardly, it is somewhat offset as shown.

The other assembly seal 19 of nylon, teflon, fiber or other suitable material, is positioned between the offset of retainer member 17 and the member 15 and inner race member 11 as shown. The interfit is such as to bar entry of dust and other foreign material into the interior of the unit and also to permit ready rotation of the parts relative to each other such as inner race member 11 relative to outer race member 12.

The outer peripheral edge portion of the retainer member 17 also abuts against the free end of the resilient member 14 at said opposite end of the assembly. To aid in holding the parts in the position illustrated, the outer peripheral edge portion of the retainer member 17 is provided with a small flange portion 17A which is positioned to embrace and confine the extreme free end portion 14C of the resilient member 14. The flange portion 17A is formed as a pinch trim in the operation of stamping out the retainer member 17.

As seen in the drawing, the resilient member portion 14A has a reduced thickness at its free end to form this free end portion 14C embraced by portion 17A of retainer 17.

The retainer member 17 held firmly in position by the flange 16D of the shell 16 holds all the parts together as a unit as illustrated.

For assembling the parts together, the shell 16 is initially of a shape wherein the major portion 16A is of one diameter, and the smaller portion at its free end where the flange 16D is to be formed is of a larger diameter. In other words, the mouth of the shell at the said opposite end is larger in diameter than that of the major length of the shell.

The inner race member 11, ball bearings 13, and outer race member 12 are then put together in the usual manner. These parts are placed in the open mouth of the cup-shaped resilient member 14, and the washer 15 is put in place to the position illustrated.

The seals 18 and 19, when utilized, are then positioned at the opposite axial ends of this assembly.

This assembled group of parts is then placed within the shell 16 to the positions illustrated and the retainer member 17 is placed to engage the washer 15, the seal 19, and the resilient member 14 to the position illustrated.

Thereafter, the larger end of the shell 16 is forced radially inward by deformation of the metal to form the shoulder portion 16C of the shell which presses axially inward against the peripheral edge portion of the retainer member to thereby lock all the parts of the assembly together in the positions illustrated. The forming of the shoulder portion 16C by such deformation also provides a flange or abutting portion 16D which is adapted to abut against a supporting structure such as the end wall of a tube in which the assembly may be mounted.

The annular space outwardly of free end portion 14C of the resilient member 14 accommodates the compression or squeezing inward of the walls of rim portion 16A of the shell when the shell is forced into the open end of a tube or other support to where the abutting portion 16D abuts against the end of such a tube or against a support.

It will be seen that we have produced a compact, sturdy bearing unit well adapted to use wherein radial and axial thrust is imparted to the unit, and which is particularly useful in resiliently absorbing such thrust without permanent deformation or injury to the unit.

A marked reduction of noise is achieved by the resilient member being interposed between metal parts so as to efficiently absorb vibration and shock which otherwise would cause noise in the usual operation of the bearing unit.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A ball bearing assembly comprising an inner race member and outer race member, said race members defining opposed annular bearing surfaces for accommodating a plurality of ball bearings located therebetween, a plurality of ball bearings arranged in a circle between said opposed annular bearing surfaces, a rigid cup-shaped shell having an annular outer portion concentric with said race members and spaced radially outward of said outer race member, said shell having an end wall portion extending radially inward from said annular outer portion at a first end of the assembly beyond said outer race member toward said inner race member to guard said ball bearings at said first end of the assembly, said shell having a shoulder portion extending radially inward from said annular outer portion at an opposite end of the assembly, a resilient member of elastomeric material having an outer portion concentric with said race members and positioned between the outer portion of said rigid cup-shaped shell and said outer race member to resist and resiliently absorb radially directed thrust between said outer race member and said outer portion of the said rigid cup-shaped shell, said resilient member having an end wall portion extending radially inward at said first end of the assembly from said outer portion of the resilient member toward said inner race member and positioned between the end wall portion of the rigid cup-shaped shell and the said outer race member to resist and resiliently absorb axial thrust between said outer race member and said end wall portion of the said rigid cup-shaped shell, a rigid washer having a central opening therein for accommodating said inner race member and disposed concentrically of said assembly, said washer abutting said outer race member at said opposite end of the assembly to hold the outer race member firmly between said washer and said end wall portion of the resilient member, and an annular retainer member having a central opening therein for accommodating said inner race member, said retainer member abutting said rigid washer to hold the same against said outer race member, the outer peripheral edge portion of said annular retainer member being positioned intermediate said shoulder portion of the rigid cup-shaped shell and the resilient member at said opposite end of the assembly and abutting said resilient member to hold the resilient member firmly against said end wall portion of the rigid cup-shaped shell, said shoulder portion of the said rigid cup-shaped shell overlapping the said outer peripheral edge portion of the annular retainer.

2. A ball bearing assembly as claimed in claim 1 wherein said rigid cup-shaped shell includes a flange portion extending radially outward from the annular outer portion thereof at said opposite end to provide an abutment for engaging a supporting member in which the assembly is mountable.

3. A ball bearing assembly as claimed in claim 1 and in which said retainer member has a flange portion extending axially from said outer peripheral edge portion of the retainer member to overlap and engage the outer portion of the resilient member at said opposite end of the assembly.

4. A ball bearing assembly as claimed in claim 3 and in which the outer portion of the resilient member at said opposite end of the assembly is reduced in diameter to accommodate the said flange portion of the retainer member.

5. A ball bearing assembly as claimed in claim 1 and in which there is an annular open space between said shell and said resilient member at said opposite end of the assembly to provide space for said flange portion of the retainer member and to permit compression of the shell at said opposite end of the assembly into said annular open space by the compression of a tubular support about the shell at said opposite end of the assembly.

6. A ball bearing assembly comprising the combination of an inner race member, an outer race member, a plurality of ball bearings arranged in a circle between the inner and outer race members to provide bearing support therebetween, a resilient member of elastomeric material and having a cup shape, the said resilient member having a rim portion disposed radially outward of and embracing said outer race member to take radially directed thrust, the said resilient member having a web portion at a first end of the assembly extending radially inward of said rim portion alongside said outer race member at said first end to take axially directed thrust, a shell of relatively rigid material having an annular outer portion concentric with said resilient member and disposed radially outward of said rim portion of the resilient member to embrace and hold the same, said shell having an end wall portion integral with the rim portion and extending radially inward therefrom along the side of the outer race member at said first end of the assembly to embrace the said web portion of the resilient member between the outer race member and the said end wall portion of the shell, a relatively rigid washer member having a central opening to accommodate said inner race member and engaging the said outer race member at said opposite end of the assembly to hold the outer race member against axial movement away from said first end of the assembly, said shell having a shoulder portion extending radially inward of the annular portion thereof at the opposite end of the assembly, and a retainer member at said opposite end of the assembly engaging and holding said washer member against said outer race member and said rim portion of the resilient member at said opposite end of the assembly, said shoulder portion of the shell overlapping the outer peripheral edge portion of the retainer member to embrace the said outer peripheral edge portion between the said shoulder portion and the rim portion of the resilient member at said opposite end of the assembly.

7. A ball bearing assembly as claimed in claim 6 wherein said shell includes a flange portion extending radially outward from the rim portion thereof to provide an abutment for engaging a supporting member in which the assembly is mountable.

8. A ball bearing assembly as claimed in claim 6 and in which said retainer member has a flange portion extending axially from said outer peripheral edge portion of the retainer member to overlap and engage the rim portion of the resilient member at said opposite end of the assembly.

9. A ball bearing assembly as claimed in claim 6 and in which the rim portion of the resilient member at said opposite end of the assembly is reduced in diameter to accommodate the said flange portion of the retainer member.

10. A ball bearing assembly as claimed in claim 6, and including the feature of an annular open space about the resilient member at said opposite end of the assembly and inwardly of the shell at said opposite end of the assembly, said annular open space permitting said retainer member to extend therein to embrace the resilient member and providing space for accommodating the radial inward compression of the shell at said opposite end upon the insertion of the assembly into the open end of a tubular support dimensioned to compress the shell upon such insertion.

11. A ball bearing assembly comprising the combination of inner and outer race members, ball bearings interposed between the race members, a resilient member embracing the outer race member, a shell for enclosing the said resilient member with the race members, and ball bearings assembled therewith, said shell having an abutting portion for engaging the end of a tubular support, said shell having an annular open space therein adjacent said abutting portion for accommodating compression of the shell adjacent said abutting portion upon mounting of the assembly into the open end of a tubular support and the inward compression of the shell toward the assembly.

12. An assembly as claimed in claim 11 and including seals in said shell at opposite axial ends thereof to shield against entry of dust and foreign material into the interior of the assembly.

13. In a ball bearing assembly having an inner and outer race member, ball bearings interposed between the race members, a resilient member embracing the outer race member, and a shell for enclosing the said resilient member with the race member, and ball bearings assembled together, the shell being adapted to be positioned in the open end of a tubular support and to be compressed radially inward at an axial end of the shell by radial inward compression of the tubular support adjacent said open end about the shell at said axial end, the improvement of an open annular space extending around said resilient member adjacent said axial end of the shell and inwardly of the shell at said axial end to accommodate the radially inward compression of the shell at said axial end to receive such radially inwardly compressed shell at said axial end, said open annular space extending radially outward to the inner wall of said shell at the said axial end of the shell for receiving therein the inwardly compressed portion of the shell.

14. The improvement claimed in claim 13 and in which the shell has an abutting portion at said axial end for engaging the end of the tubular support at said open end of the tubular support, and in which said annular open space facilitates the radial inward movement of the abutting portion upon the radially inward compression of the shell at said axial end into said annular open space upon the insertion of the shell into the open end of the tubular support and the engagement of said abutting portion with said end of the tubular support.

15. The improvement claimed in claim 13 and including a retainer member at said axial end of the shell, the said retainer member having its outer peripheral edge portion flanged in an axial direction about the end of the resilient member at said axial end and into said annular open space to embrace said resilient member at said axial end.

* * * * *